(12) United States Patent
Yost et al.

(10) Patent No.: US 8,711,247 B2
(45) Date of Patent: Apr. 29, 2014

(54) AUTOMATICALLY CAPTURING IMAGES THAT INCLUDE LIGHTNING

(75) Inventors: Jason Yost, Windsor, CO (US); Shane D Voss, Fort Collins, CO (US); John Mick, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/456,831

(22) Filed: Apr. 26, 2012

(65) Prior Publication Data

US 2013/0286249 A1 Oct. 31, 2013

(51) Int. Cl.
*H04N 5/76* (2006.01)

(52) U.S. Cl.
USPC .................................. 348/231.99

(58) Field of Classification Search
None
See application file for complete search history.

(56) References Cited

U.S. PATENT DOCUMENTS

| | | | |
|---|---|---|---|
| 7,187,412 B1 * | 3/2007 | Silverstein | 348/333.01 |
| 7,245,315 B2 | 7/2007 | Sadok et al. | |
| 7,947,954 B2 | 5/2011 | Snider et al. | |
| 8,059,866 B2 | 11/2011 | Dutton et al. | |
| 2003/0043292 A1 | 3/2003 | Pyle et al. | |
| 2012/0057754 A1 * | 3/2012 | Dunton et al. | 382/103 |
| 2012/0092347 A1 * | 4/2012 | Du | 345/473 |
| 2012/0169901 A1 * | 7/2012 | Chang | 348/238 |

OTHER PUBLICATIONS

Unknown, "Lightningcam—Capture Lightning with the Ultra Fast Iphone 4S Camera," available at URL <http://www.iphonetunes.net/index.php/full_article/comments/lightningcam—capture_lightning_with_the_ultra_fast_iphone_4s_camera/ >, website, published Nov. 7, 2011.

* cited by examiner

*Primary Examiner* — Twyler Haskins
*Assistant Examiner* — Padma Haliyur

(57) ABSTRACT

A method is disclosed for capturing one or more images that include a lightning strike using an image capturing device. The method is performed by one or more processors of the image capturing device. The one or more processors automatically capture a plurality of images during a period of time using the lens of the device. Each of the plurality of images is processed to detect a presence of lightning within each image. Each image is processed based, at least part, on two consecutive captured images. Images that have been determined to include the presence of lightning are stored in a memory resource of the image capturing device.

10 Claims, 5 Drawing Sheets

AUTOMATICALLY CAPTURING IMAGES THAT INCLUDE LIGHTNING

BACKGROUND

By nature, lightning is a temporal event, lasting a very short amount of time. At the same time, lightning is a very popular subject for photography. Given the nature of lightning, the act of photographing lightning is difficult, especially to the amateur photographer.

BRIEF DESCRIPTION OF THE DRAWINGS

The disclosure herein is illustrated by way of example, and not by way of limitation, in the figures of the accompanying drawings and in which like reference numerals refer to similar elements, and in which.

DETAILED DESCRIPTION

Figure 1:
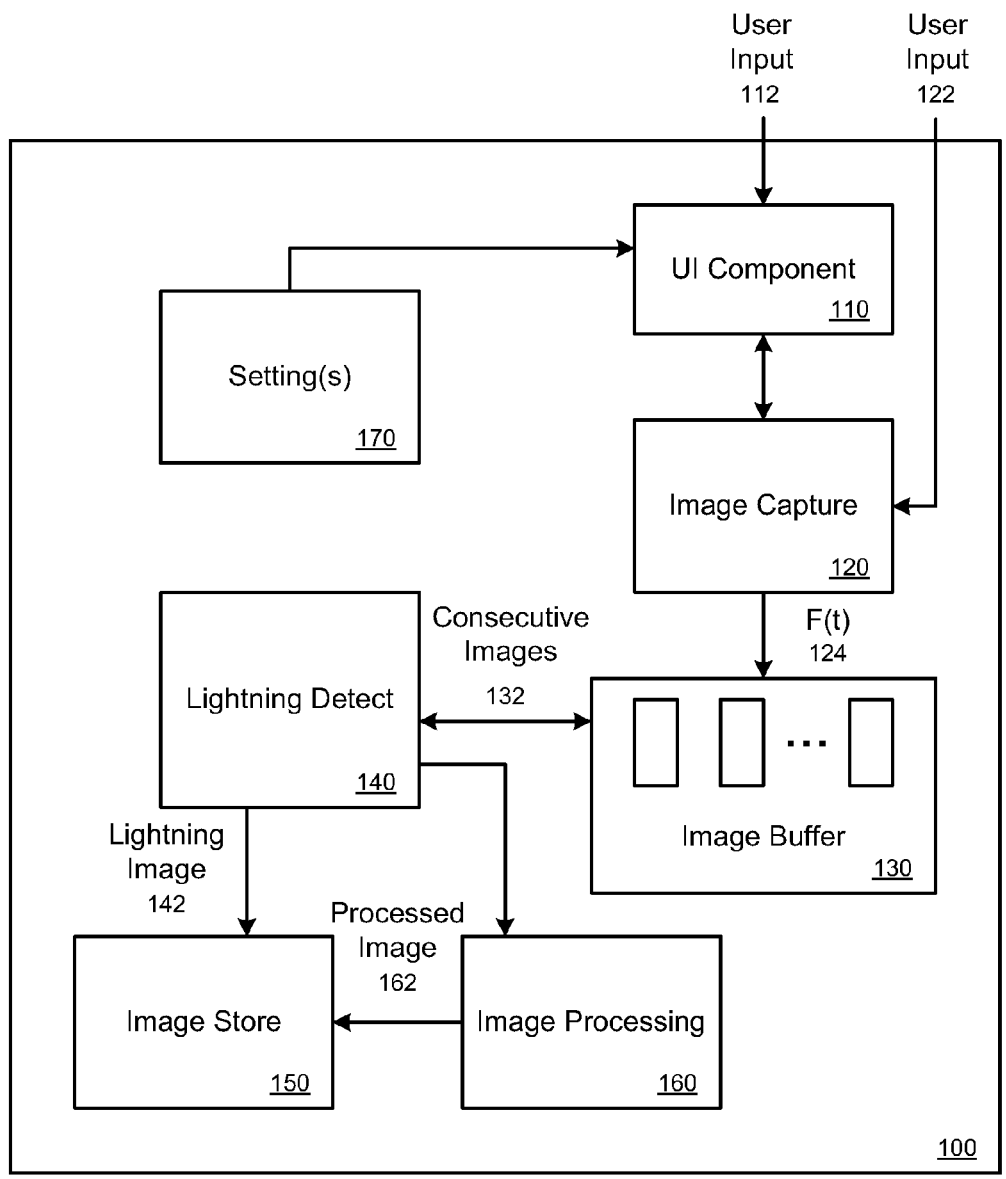
FIG. 1 illustrates an example device for capturing an image of a lightning strike, under an embodiment.

Embodiments described herein provide for an image capturing device that can automatically capture images of lightning in nature. In an embodiment, an image capturing device is provided that includes a lightning capture mode for capturing images of lightning that occurs in nature (e.g., a bolt of lightning from the sky). In some embodiments, a device can automatically capture multiple images in a given duration, then process the images individually to detect the presence of lightning.

According to an embodiment, the image capturing device can automatically capture multiple images of a scene using its lens and/or other components (e.g., filters, sensors) during a defined period of time. A user can configure or adjust the number of images that are captured during the period of time and the period of time itself. For example, the user can configure the device to capture a certain number of images per second (e.g., 20 frames per second or fps) and set the period of time as five seconds.

In one embodiment, an image capturing device can automatically capturing images during a period of time using a lens and/or other image capturing components. Each of the plurality of images can be processed to detect a presence of lightning within each image. Each image can be processed based, at least in part, on two consecutively captured images. One or more images that have been determined to include the presence of lightning can be stored in a memory resource of the image capturing device.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules or components of a system. A programmatic module or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as digital cameras, digital camcorders, desktop computers, cellular or smart phones, personal digital assistants (PDAs), laptop computers, printers, digital picture frames, and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates an example device for capturing an image of a lightning strike, under an embodiment. A device such as described with respect to FIG. 1 can be implemented on, for example, a digital camera or a small-form factor device, or other computing form factors such as tablets, notebooks, desktops computers, and the like. Device 100 can capture images and automatically analyze the images to detect one or more images that include lightning (e.g., one or more lightning bolts in the sky). In one embodiment, the device 100 can be operated in a lightning capture mode.

Device 100 includes user interface (UI) component 110, image capture 120, image buffer 130, lightning detect 140, image store 150 and image processing 160. The components of device 100 combine to automatically capture a sequence of images and to automatically process two or more images in the sequence to detect the presence of lightning. For example, each image can be processed based, at least in part, on two consecutively captured images (e.g., one image and the next consecutively captured image) in order to determine whether the image includes a lightning strike.

According to an embodiment, the UI component 110 can generate one or more features that are to be presented on a display of the image capturing device. For example, the UI component 110 can generate user interface features for a camera application and/or other application(s) that can be executed and operated by the image capturing device. The UI component 110 can also provide a menu or other selectable features that the user can access in order operate the camera application and/or other application(s). The user can interact with the camera application or other applications by providing inputs 112 via one or more input mechanisms. In one embodiment, the UI component 110 can provide selectable features on a touch-sensitive display of the image capturing device. The user can provide user input 112 for interacting with the content provided by the UI component by touching or tapping (e.g., or performing gestures) on the touch-sensitive display.

The device 100 includes an image capture 120 for capturing one or more images by using a lens and other components of the image capturing device (e.g., filter, image sensor). An image capturing device, such as a camera, can receive and detect light from a scene (e.g., from whatever view and/or object(s) the lens is pointing at). A user of the image capturing device can capture an image of the scene by pressing down on a capture button or trigger, or by using another user interface feature (e.g., tap a "capture image" graphic feature provided on a touch-sensitive display). The image capture 120 enables a user to capture one or more images via the user input 122.

According to an embodiment, the user can operate the image capture 120 in different modes of operation. For example, the image capture 120 can be operated in a normal or standard image capturing mode (including a video capture mode), in which the user can capture one or more images of a scene by pressing a capture button or trigger. The image capture 120 can also operate in a preview mode (e.g., the user can view images and/or videos that she has captured), a settings mode (e.g., the user can adjust one or more settings), and a lightning capture mode. The user can switch between the different modes by providing user input 122 to the image capture 120 via one or more input mechanisms (e.g., buttons and/or touch-sensitive display).

When the user wants to capture images of lightning strikes, the user can operate the image capturing device in a lightning capture mode (e.g., switch the device from operating in the standard image capture mode to the lightning capture mode via the user input 122). In the lightning capture mode, the image capture 120 can automatically capture a plurality of images during a defined period of time (e.g., the image capturing period) using the lens and/or other components of the image capturing device. According to an embodiment, the user can provide an input 122 to cause the image capture 120 to begin capturing a plurality of images and another input 122 to cause the image capture 120 to stop capturing images.

For example, once the device is operating in the lightning capture mode, the user can press the capture image trigger or button, and in response, the image capture 120 can automatically capture a plurality of images periodically until the image capturing period of time ends (or until the user stops the image capturing process). The images being captured are of the scene or views of whatever the lens is focused or pointed at (e.g., the sky at a distance because the user wants to capture images of lightning strikes). The image capture 120 can periodically capture the images at a particular rate (e.g., twenty frames per second) during the image capturing period.

In some embodiments, the rate of image capture during the lightning capture mode can be preset or configured by the user.

The defined period of time can also be adjustable by a user and can have a specific duration, e.g., five seconds or seven seconds. Once the user causes the image capture 120 to capture a plurality of images in the lightning capture mode, the image capture 120 can capture a plurality of images periodically for the duration of the period of time. For example, the rate at which the image capture 120 captures the images can be set to thirty frames per second (fps) so that during a seven second image capturing period, the image capture 120 can capture a total of 210 images.

In one embodiment, the image capture 120 can automatically stop capturing images after the duration of image capturing period ends. In another embodiment, the user can manually cause the image capture 120 to stop capturing images by providing an input 122 via a user input mechanism (e.g., if for example, the user sees a lightning strike occur and assumes that the image capture 120 captured an image of the lightning strike). The user can adjust each of the rate of image capture, the duration of the image capture, the quality of the images, e.g., by using a menu provided by the image capturing device.

According to an embodiment, the image capture 120 can also provide image data to the UI component 110 in order to provide a preview of what the lens of the image capturing device is focused on or pointed towards. The UI component 110 can provide the image of the scene on the display of the image capturing device so that the user can see what would be captured by the image capture 120. For example, when the lens of the image capturing device is pointed towards and focusing on the sky and the hills in the distance, a preview image of the scene can be presented on the display of the device. In this way, the user can aim the lens of the image capturing device at an area of the sky where lightning is likely to occur, and see the exposure level, focus, colors, etc., and adjust one or more settings of the image capturing device according to user preference.

The preview can be displayed on the display of the image capturing device, so that the photographer can not only aim the shot (to capture the scene she wants), but to see the exposure level and focus. In one embodiment, the exposure level of the preview image can be automatically controlled so that the ambient light level is held at a natural looking light level to the human eye. The exposure time of the preview is short enough so that the user can hold the image capturing device by hand without causing an objectionable amount of blur in the scene (e.g., 1/30 of a second). In some embodiments, many preview frames can be stacked on top of each other to give an overall appearance of the light conditions and to remove noise.

As the image capture 120 captures the images, it temporarily stores the plurality of captured images in the image butter 130. The captured images can be stored after the image capturing period ends or as the images are being captured in real-time, depending on embodiments. The number of images that are captured in the lightning capture mode varies as a function of time F(t) 124 (e.g., the image capture 120 can capture 150 images during the image capturing period of five seconds at a rate of 30 fps). Each captured image is provided to the image buffer 130.

In some embodiments, the image buffer 130 can be implemented by a processing resource by using a virtual data buffer in software (e.g., pointing to a location in the physical memory) or can be implemented in a fixed memory location in hardware (e.g., in a memory resource). The number of images that can be temporarily stored in the image buffer 130 can be based on a number of different factors, e.g., the size of the memory resource, the size/quality of the images, or the rate of the images being captured by the image capture 120.

While the images are being captured and stored in the image buffer 130 by the image capture 120, the lightning detect 140 can process each of the captured images to detect whether the image includes the presence of lightning. In some embodiments, the lightning detect 140 processes each image as soon as the image is captured (e.g., process images concurrently while images are being captured) and stored in the image buffer 130 (e.g., process the image in real-time). In other embodiments, the lightning detect 140 processes each of the images once the image capture 120 stops capturing the images (e.g., after the image capturing period ends or after the user switches out of the lightning capture mode).

In one embodiment, images that are determined to not include lightning can be automatically deleted from the image buffer 130. By automatically discarding or deleting images that do not include a lightning strike, the image capturing device can continue capture a plurality of images without running out of buffer space in the image buffer 130.

Each captured image can be processed by the lightning detect 140. The lightning detect 140 can operate an image recognition application or software, or other image processing methods in order to determine if an image includes the presence of lightning. In one embodiment, the lightning detect 140 can analyze each image for characteristics that are indicative of lightning strikes. For example, lightning strike characteristics can include presence of white light streaks, and/or bright colored, narrow, forked features with a plurality of short or long lines at different jagged angles. The lightning strike characteristics can also include the location of lightning strikes, which is typically found in the upper half of an image, e.g., due to the lightning occurring at a distance in the sky relative to the horizon or other geographic features (hills, fields, trees, buildings, bridges, etc.) in the distance. The lightning detect 140 can analyze each image for such characteristics in order to determine whether the image includes lightning.

In some embodiments, the lightning detect 140 can perform a horizontal and/or a vertical search on each image to detect the lightning strike characteristics. The searches can be performed concurrently or individually on each image (e.g., perform a horizontal search then perform a vertical search). The lightning detect 140 can also use a grid search to look around for changes in the images in only specific areas. For example, the lightning detect 140 can look for the lightning characteristics in only an upper portion of the images.

The lightning detect 140 can also process each image in the image buffer 130 to detect the presence of lightning based on consecutively captured images 132. Each image can be processed to detect lightning by using information that was determined from a previously captured image or determined from a subsequently captured image 132. For example, if the $50^{th}$ image (out of 150 captured images in five seconds, for example) was determined to not include a lighting strike, but the next captured image, i.e., the $51^{st}$ image, included a lightning characteristic, the lightning detect 140 can use the information from the $50^{th}$ image (e.g., that no lightning existed) to determine that the $51^{st}$ image was where a lightning strike was first seen (in the sequence of captured images).

In another example, the lightning detect 140 can use the information from the $51^{st}$ image, e.g., that a lightning characteristic was found in the image, to verify that the $50^{th}$ image does not include a lightning strike. Similarly, the lightning detect 140 can use the information from processing the $51^{st}$ image to determine whether a lightning strike exists in the $52^{nd}$ image. Because the images are captured in close proximity in time with each other (e.g., image can be captured at a rate of 30 fps), the lightning detect 140 can determine a region or portion of the $51^{st}$ image where the lightning was detected and search a similar region or portion of the $52^{nd}$ image to see if lightning is still present. In some embodiments, the lightning detect 140 can process each of the images based on three or more consecutively captured images.

The lightning detect 140 can store the one or more lightning images 142 (e.g., images that include lightning strikes) in an image store 150. The images 142 can be stored as the lightning detect 140 processes the images stored in the image buffer 130. In other embodiments, the lightning detect 140 can tag or mark the images that have been identified as including the presence of lightning (or tag the images that do not include lightning or tag in a different manner) and store them at a later time (e.g., transfer or copy the images 142 from the image buffer 130 to the image store 150). The images can remain stored in the image buffer 130 for a period of time for later transfer to the image store 150 or for other processing. In another embodiment, whatever images that are not marked by the lightning detect 140 (e.g., do not include lightning) are automatically deleted from the image buffer 130. Still further, in some embodiments, the images that are not marked can be deleted or discarded at a later time (e.g., after the device switches out of the lightning capture mode). For example, the user can confirm the deletion of the images that have been determined to not include lightning (e.g., the images that are not marked and not stored in the image store 150) before the images are deleted from the image buffer 130.

According to some embodiments, the images that are stored in the image store 150 can be viewed or previewed by the user. The user can, via user input mechanisms, browser or scroll through the images that have been identified as including lightning. The images can be displayed on the display of the image capturing device (e.g., display the full image or a thumbnail of the image). The user can, at a later time, retrieve the images that he or she wants from the image store (via wire connections to another device, e.g., using a universal serial bus cable, or via wirelessly by sending the images to another device or remote storage, e.g., to the cloud). The image capturing device can include network resources to communicate with other devices (e.g., via cellular, Bluetooth or Wi-Fi) so that the user can also send the images to other users (via as attachments to email or text messages).

The image processing 160 can also receive lightning images (that are marked as including the presence of lightning) from the lightning detect 140, or in some embodiments, can retrieve lightning images directly from the image buffer 130. The image processing 160 can perform a variety of different image processing techniques to the images that include the presence of lightning. The image processing can be performed in real time as the images are being captured and stored in the image buffer 130 or after all the images are captured.

For example, the image processing 160 can automatically combine portions of lightning images (or combine entire images together) by overlaying a portion of an image onto another image to create a combined image with a better view of the lightning strike. If two consecutively captured images are determined to include the presence of lightning, the image processing 160 (or the lightning detect 140) can determine that the lightning in the images stem from the same region of the sky or stem from the same lightning bolt. A portion of one of the images that includes the lightning can be overlaid on the other image to create a combined image that provides a better image of the lightning. An image with a dramatic effect can be created.

A lighting strike can be captured by a plurality of consecutively captured images, because a lightning strike can last for a duration of 0.25 seconds, for example. The image processing 160 can use an index or information of the lightning images to determine the sequence of the captured lightning images and combine portions images together. For example, a lightning strike that is captured in consecutively captured images can stem from the same portion or location of the image (e.g., multiple forks of a lightning strike can initially stem from one base). The image processing 160 can determine a region or portion of a first image with a lightning strike, crop or copy the portion containing the lightning strike, and overlay it on the next consecutively captured image with the lightning strike occurring in the similar location. The processed image 162 can then be stored in the image store 150.

The image processing 160 can also process the lightning images by altering the images. For example, various filters or image alteration techniques can be applied by the image processing 160 to change the colors, contrasts, tint, brightness, etc. of the lightning images (e.g., apply a hue colors, or make black and white). In some embodiments, the image processing 160 can create a video or slide show or highlight reel using the lightning images (e.g., can be in sequence to show the lightning strike beginning, growing larger, and then disappearing, or can be out of sequence). The processed images and slide shows can be stored in the image store 150. The user can also preview these images on a display of the image capturing device.

The device 100 also includes settings 170. The settings 170 enables the device 100 to receive information about device location and/or orientation from one or more sensors of the image capturing device (e.g., magnetometer, accelerometer) and from a GPS application. In some embodiments, the device 100 can wirelessly communicate with a weather services or other network resources (via a wireless network connection) to determine information about potential lightning strikes near the user or the device (e.g., location, time of day). The settings 170 can use the received information about the device (e.g., its location or orientation, direction it is currently pointing) and potential lightning strike locations to help guide or instruct the user to point the lens of the image capturing device to a particular direction or align the device in a particular manner for best capturing a lightning strike. The UI component 110 can generate the instructions via a displayed graphic interface for display on the display of the image capturing device.

For example, the weather services may provide information that lighting strikes are predicted to occur near the Bay Bridge in Northern California's Bay Area. The settings 170 can determine the location and orientation of the device, the manner in which the user is currently holding the device, the direction in which the user is facing, and using the weather services information, can provide instruction information for the user. The user (via the graphic interface) can be notified to keep rotating until the device is facing the right direction, and can instruct the user to point the lens more upwards or more downwards. In some embodiments, a graphical line can be provided on the display to show the user how to align the image capturing device so that the horizon from the perspective of the lens is lining up with the graphical line on the display.

In alternative embodiments, the lightning detect 140 can receive information from the settings 170 to provide a verification method for determining whether an image includes a lightning strike (e.g., by using location and time information, and information from weather services whether lightning actually existed).

According to an embodiment, when the image capturing device is switched to operate in a lightning capture mode, the image capturing device can also operate under a specific set of image capturing settings. The device can automatically determine environmental conditions, such as ambient exposure levels, and determine the current image capturing settings. One or more of the settings can be automatically adjusted in response to the user switching the device from one mode to the lightning capture mode. In one embodiment, the user can also be prompted to confirm adjusted set of image capturing settings via a user interface feature. The prompt can be presented on the display of the image capturing device.

For example, settings that can be automatically configured or enabled/disabled can include: strobe/flash, shutter sound or other alert sounds, white balance settings (e.g., for indoors vs. outdoors), sharpness, contrast, ISO speed, shutter speed, aperture size, aspect ratio of images, exposure settings, shutter priority, aperture priority, micro vs. macro settings, landscape settings for adjusting depth of fields, timers, audio sensitivity, zoom settings, image and video resolutions, filters, red-eye removal, etc. The set of settings in which to operate the lighting capture mode can be tailored for capturing lightning strikes (e.g., turning off the flash, adjusting the contrast or white balance for better seeing the lightning strike).

In some embodiments, some of the components that are described in device 100 can be provided as being individual components or as being part of the same component. For example, the UI component 110 and the image capture 120 can be provided as part of the same component. In another example, the lightning detect 140 and the image processing 160 can be provided as part of the same component. In another embodiment, the components that are described in device 100 can be provided as part of the device operating system or as part of one of more applications (e.g., as part of a camera application). Logic can be implemented with a camera application (e.g., software) and/or with hardware of the image capturing device.

Methodology

Figure 2:
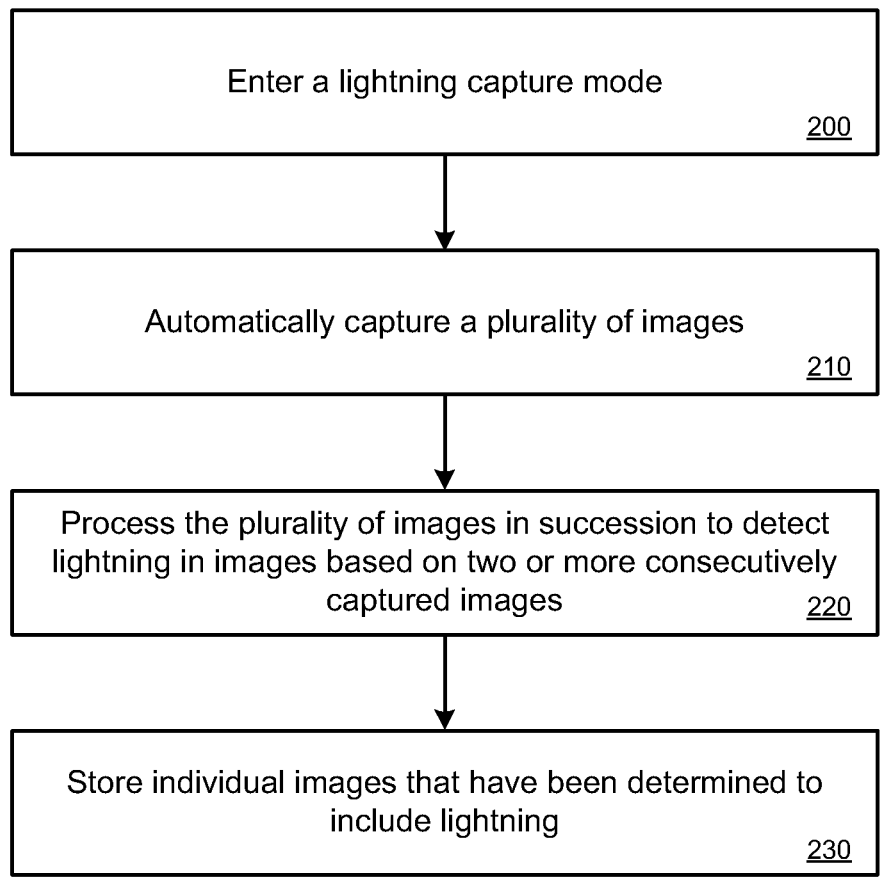
FIG. 2 illustrates an example method for capturing an image of a lightning strike using an image capturing device, according to an embodiment.

FIG. 2 illustrates an example method for capturing an image of a lightning strike using an image capturing device, according to an embodiment. A method such as described by an embodiment of FIG. 2 can be implemented using, for example, components described with an embodiment of FIG. 1. Accordingly, references made to elements of FIG. 1 are for purposes of illustrating a suitable element or component for performing a step or sub-step being described.

The user can operate the image capturing device in a lightning capture mode. In response to a user action to switch modes, the image capturing device can enter a lightning capture mode (step 200). Once the image capturing device operates in the lightning capture mode, one or more image capturing settings can be adjusted for better capturing lightning strikes.

In the lightning capture mode, the image capturing device can automatically capture a plurality of images (step 210). For example, the user does not have to manually press or provide an input for capturing each of the plurality of images (e.g., press fifty times to capture fifty images). The image capturing device can be configured to capture a plurality of images in response to the user switching the operating mode to the lightning capture mode, or in response to a single user input to begin capturing the plurality of images. In one embodiment, the image capturing device captures the images at a particular rate and for a defined duration of time (e.g., at a rate of 20 fps and for five seconds). Each of the captured images can be stored in an image buffer.

The processing resources of the image capturing device can process each of the plurality of images in succession to detect whether lightning exists within each image based, at least in part, on two or more consecutively captured images (step 220). The processing resources can apply various image processing techniques or operations to detect whether lightning exists in each image. In some embodiments, the processing resources search for various lightning characteristics that are indicative of lightning strikes.

The processing resources process the images based on consecutively captured images. For example, when processing an image, information from a previously captured image can be used to better determine whether lightning exists in the image. The processing resources can identify the differences between consecutively captured images (e.g., see if a lightning characteristic shown in one image exists in the next image or see how it changes, see if the lightning characteristic(s) is substantially different in one image versus the next three consecutively captured images). Information from consecutively captured images can also be used to verify the accuracy of the individual image processing. Other image processing includes overlaying portions of images onto other images, combining multiple images together, changing the colors and contrasts of the images, or creating a video, highlight reel or slideshow.

The image(s) that have been determined to include the presence of lightning can be automatically stored in a memory resource of the image capturing device (step 230). Similarly, images that have been determined to not include lightning can be automatically deleted from a buffer. The user can preview the images that have been identified and marked as being a lightning image and access the data store to retrieve lightning images for future use. The processed images, e.g., the combined image or the altered image, can also be stored in the memory resource.

Figure 3:
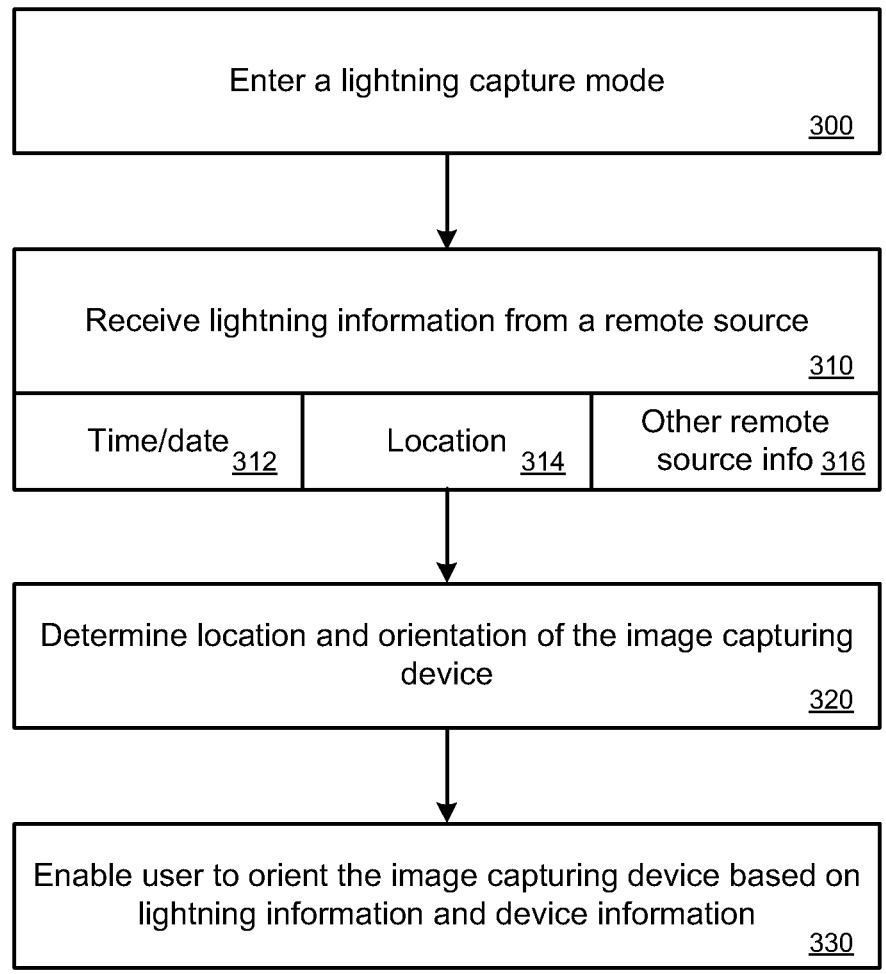
FIG. 3 illustrates an example method for assisting a user in capturing an image of a lightning strike using an image capturing device, under an embodiment.

FIG. 3 illustrates an example method for assisting a user in capturing an image of a lightning strike using an image capturing device, under an embodiment. A method such as described by an embodiment of FIG. 3 can be implemented using, for example, components described with an embodiment of FIG. 1. Accordingly, references made to elements of FIG. 1 are for purposes of illustrating a suitable element or component for performing a step or sub-step being described.

The user can operate the image capturing device in a lightning capture mode. In response to a user action to switch modes, the image capturing device can enter a lightning capture mode (step 300). The processing resources of the image capturing device can receive lightning information from a remote source, such as weather service or other remote network information service (step 310). The lightning information can include information that pertains to lightning that is to occur near the location of the user or the user's image capturing device. For example, lightning information can include the time of day and dates in which lightning strikes are potentially supposed to occur (sub-step 312), the location or direction in which the lightning strikes may occur (sub-step 314), or other information from the remote source, such as general weather information, etc. (sub-step 316).

The processing resources can also determine various information about the image capturing device (step 320). Such information can include the current location of the device, the orientation, the manner in which the user is holding the device, what direction the lens of the image capturing device facing, etc., using one or more sensors and applications (e.g., GPS application) of the image capturing device.

Based on the lightning information and the device information, the processing resources can generate and provide a user interface on a display of the image capturing device to assist and instruct the user to move and hold the device in a certain manner for better capturing a lightning strike (step 330). The user is enabled to orient the image based on the information provided. For example, the user interface can provide arrows and directions showing the user which way to turn and which direction to focus the lens of the image capturing device on (see FIG. 4). The user interface can tell the user to simply face North or Northwest. In other examples, the user interface can instruct the user that the lighting strike can be better seen if the user traveled along a certain route for a certain distance and then to focus the image capturing device in a particular direction. Such information provided on the user interface can be based on the lightning information and device information.

User Interface

Figure 4:
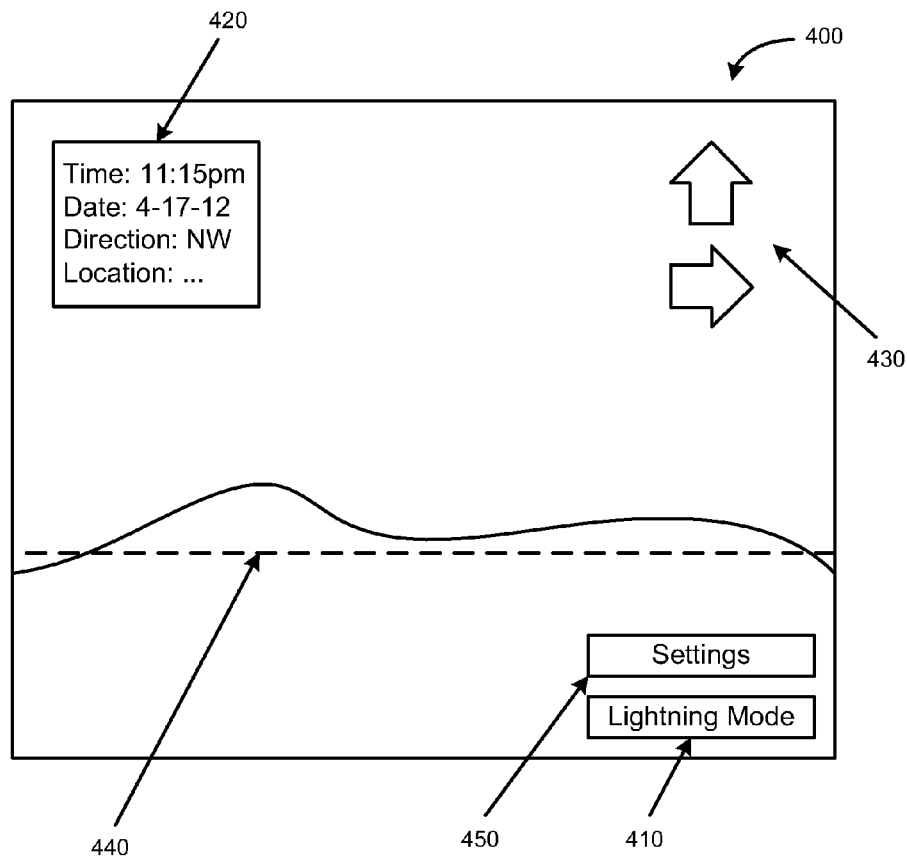
FIG. 4 illustrates an example user interface for assisting a user in capturing an image of a lightning strike, according to an embodiment.

FIG. 4 illustrates an example user interface for assisting a user in capturing an image of a lightning strike, according to an embodiment. A user interface such as described by an embodiment of FIG. 4 can be implemented using, for example, components described with an embodiment of FIG. 1. The user interface 400 can be provided on a display (e.g., a touch-sensitive display) of the image capturing device. The user interface 400 includes an identifier 410 that shows the current mode in which the image capturing device is operating in. The user interface 400 also includes an informational feature 420 that provides a variety of information, such as the time, date, the direction in which the device is currently facing, the location, the rate of image capture in the mode, etc.

The user interface 400 also includes directional guidance 430 that can assist the user in properly orienting the image capturing device for better capturing lightning. For example, based on the lightning information received from a remote source (e.g., weather service) and the current device information (e.g., location, orientation, direction it is facing), the user interface 400 can provide arrows and/or text ("turn left") and/or sounds for the user to follow. The information can disappear once the user completes the actions. The user interface 400 can also include a graphic horizon line 440 for assisting the user to properly position the image capturing device. The user can align the view of the real horizon (or other feature from the scenes, such as building skylines, a bridge, etc.) with the graphic horizon line 440 for better capturing lightning.

In some embodiments, the user interface 400 can also include one or more selectable features, such as a settings or menu feature 450, which the user can select to change various settings for the current mode in which the device is operating in (e.g., the lightning mode). The user can select the settings graphic feature 450 to choose or adjust different settings for capturing lightning (e.g., change the rate of images being captured or the defined period of time in which the images are captured). Other graphic features and selectable features can be provided on the user interface 400.

Hardware Diagram

Figure 5:
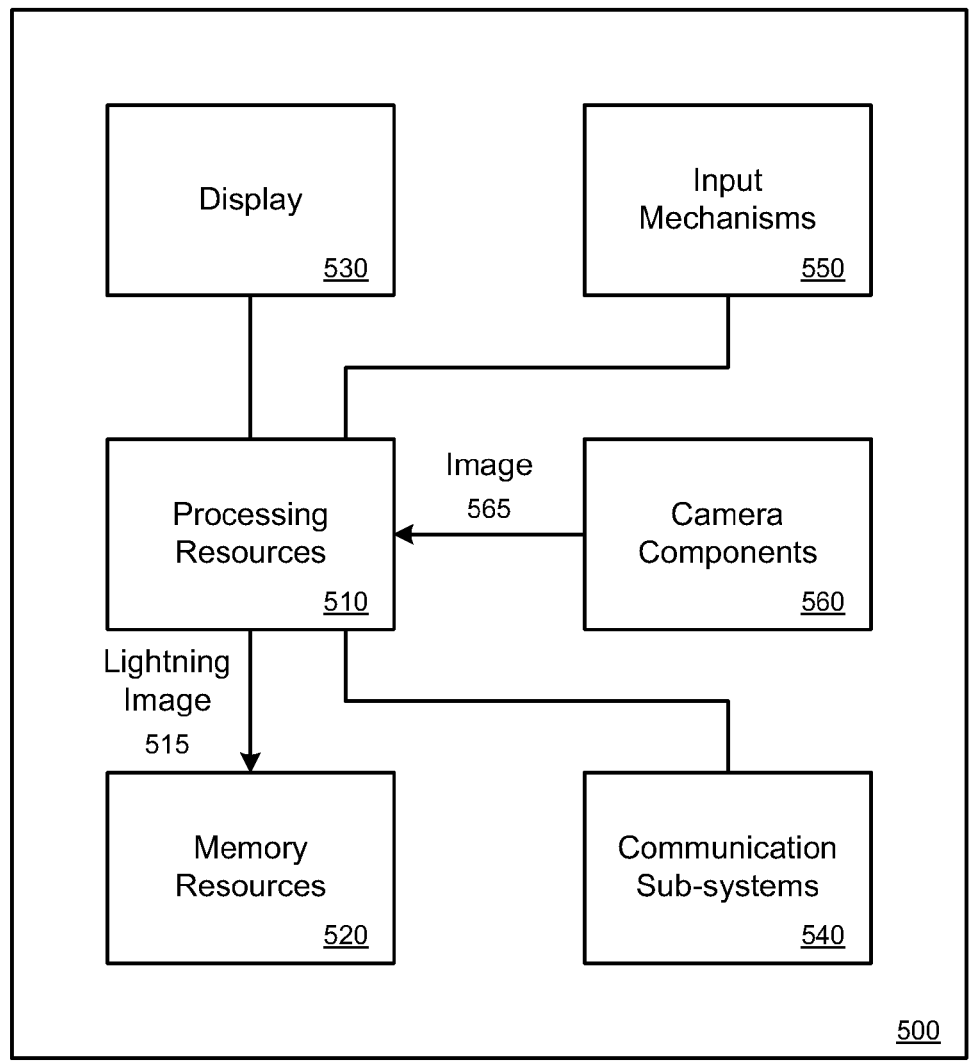
FIG. 5 illustrates an example hardware diagram for a system for operating an image capturing device, under an embodiment.

FIG. 5 illustrates an example hardware diagram of a computer system upon which embodiments described herein may be implemented. For example, in the context of FIG. 1, the device 100 may be implemented using a computer system such as described by FIG. 5. In one embodiment, a computing device 500 may correspond to a mobile computing device, such as a cellular device that is capable of telephony, messaging, and data services. Examples of such devices include smart phones, handsets or tablet devices for cellular carriers, digital cameras, or laptops and desktops (e.g., PC). Computing device 500 includes processing resources (e.g., one or more processors) 510, memory resources 520, a display device 530, one or more communication sub-systems 540 (including wireless communication sub-systems), input mechanisms 550, and camera components 560. In one embodiment, at least one of the communication sub-systems 540 sends and receives cellular data over data channels and voice channels.

The processing resources 510 are configured with software and/or other logic to perform one or more processes, steps and other functions described with embodiments, such as described by FIGS. 1-4, and elsewhere in the application. The processing resources 510 are configured, with instructions and data stored in the memory resources 520, to implement the device 100 (as described with FIG. 1). For example, instructions for implementing the UI component, the image capture, the image buffer, the lightning detect, the image store, the image processing, and the settings can be stored in the memory resources 520 of the computing device 500. The processing resources 510 can execute instructions for operating the lightning detect and for processing images 565 that have been captured by the lens and/or other components 560 of the image capturing device. The processing resources 510 can also execute instructions for storing lightning images 515 (e.g., images that include the presence of lightning) in the memory resources 520 of the device 500.

According to an embodiment, the processing resources 510 can provide content to the display 530 by executing instructions and/or applications that are stored in the memory resources 520. The content can include a preview image of a scene in which the lens of the image capturing device is pointed towards or focused on. The content can also be provided in response to a user operating a camera application. In some embodiments, the processing resources 510 can execute and operate a variety of different applications and/or functionalities, such as, for example, a home page or start screen, an application launcher page, messaging applications (e.g., SMS messaging application, e-mail application, IM application), a phone application, game applications, calendar application, document application, web browser application, clock application, camera application, media viewing application (e.g., for videos, images, audio), social media applications, financial applications, and device settings.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method for capturing one or more images that includes a lightning strike using an image capturing device operable in a lightning capture mode, the method being performed by one or more processors and comprising:
   receiving lightning information from a remote resource, the lightning information pertaining to one or more potential lightning strikes that are to occur near a location of the image capturing device;
   generating a directional feature on a display of the image capturing device to prompt a user to point the image capturing device in a specified direction corresponding to the one or more potential lightning strikes;
   automatically capturing a plurality of images during a period of time through a lens of the image capturing device;
   storing the plurality of images in a buffer of the image capturing device;
   processing each of the plurality of images to detect a presence of lightning within each image, wherein each image is processed based, at least in part, on a comparison between two or more consecutively captured images;
   in response to processing each of the plurality of images, deleting images from the buffer that are determined to not include the presence of lightning; and
   in response to processing each of the plurality of images, storing images in a memory resource of the image capturing device that are determined to include the presence of lightning.

2. The method of claim 1, wherein processing each of the plurality of images includes combining at least a portion of a first image that has been determined to include the presence of lightning with a second image that has also been determined to include the presence of lightning, and wherein storing the one or more images includes storing the combined image in the memory resource.

3. The method of claim 1, wherein operating the image capturing device in the lightning capture mode includes automatically adjusting one or more settings of the image capturing device.

4. An image capturing device operable in a lightning capture mode comprising:
   a lens;
   a display;
   a memory resource; and
   one or more processors to:
      receive lightning information from a remote resource, the lightning information pertaining to one or more potential lightning strikes that are to occur near a location of the image capturing device;
      generate a directional feature on the display to prompt a user to point the image capturing device in a specified direction corresponding to the one or more potential lightning strikes;
      automatically capture a plurality of images during a period of time through the lens;
      store the plurality of images in a buffer of the image capturing device;
      process each of the plurality of images to detect a presence of lightning within each image, wherein each image is processed based, at least in part, on a comparison between two or more consecutively captures images;
      in response to processing each of the plurality of images, delete images from the buffer that are determined to not include the presence of lightning; and
      in response to processing each of the plurality of images, store images in the memory resource that are determined to include the presence of lightning.

5. The image capturing device of claim 4, wherein the one or more processors process each of the plurality of images by combining at least a portion of a first image that has been determined to include the presence of lightning with a second image that has also been determined to include the presence of lightning, and store the one or more images by storing the combined image in the memory resource.

6. The image capturing device of claim 4, wherein the one or more processors operate the image capturing device in the lightning capture mode by automatically adjusting one or more settings of the image capturing device.

7. A non-transitory computer readable medium storing instructions that, when executed by one or more processors of an image capturing device, cause the one or more processors to perform steps comprising:
   receiving lightning information from a remote resource, the lightning information pertaining to one or more potential lightning strikes that are to occur near a location of the image capturing device;
   generating a directional feature on a display of the image capturing device to prompt a user to point the image capturing device in a specified direction corresponding to the one or more potential lightning strikes;
   automatically capturing a plurality of images during a period of time through a lens of the image capturing device;
   storing the plurality of images in a buffer of the image capturing device;
   processing each of the plurality of images to detect a presence of lightning within each image, wherein each image is processed based, at least in part, on a comparison between two or more consecutively captured images;
   in response to processing each of the plurality of images, deleting images from the buffer that are determined to not include the presence of lightning; and
   in response to processing each of the plurality of images, storing images in a memory resource of the image capturing device that are determined to include the presence of lightning.

8. The non-transitory computer readable medium of claim 7, wherein processing each of the plurality of images includes combining at least a portion of a first image that has been determined to include the presence of lightning with a second image that has also been determined to include the presence of lightning, and wherein storing the one or more images includes storing the combined image in the memory resource.

9. The non-transitory computer readable medium of claim 7, wherein the one or more processors are configured to execute the instructions when the user configures the image capturing device in a lightning capture mode.

10. The non-transitory computer readable medium of claim 9, wherein the instructions, when executed by the one or more processors, cause the one or more processors to perform steps further comprising:
   automatically adjusting one or more settings of the image capturing.

* * * * *